(12) United States Patent
Cheung

(10) Patent No.: US 7,743,272 B1
(45) Date of Patent: Jun. 22, 2010

(54) METHODS AND APPARATUS FOR GENERATING PRECISE TIMING INFORMATION USING PROGRESSIVE BLOCK AVERAGING

(75) Inventor: Colman C. Cheung, San Diego, CA (US)

(73) Assignee: Altera Corporation, San Jose, CA (US)

( * ) Notice: Subject to any disclaimer, the term of this patent is extended or adjusted under 35 U.S.C. 154(b) by 719 days.

(21) Appl. No.: 11/707,834

(22) Filed: Feb. 16, 2007

Related U.S. Application Data

(60) Provisional application No. 60/812,307, filed on Jun. 8, 2006.

(51) Int. Cl.
*G06F 1/04* (2006.01)
(52) U.S. Cl. .................... 713/500; 713/503
(58) Field of Classification Search .............. 713/500
See application file for complete search history.

(56) References Cited

U.S. PATENT DOCUMENTS

| | | | | |
|---|---|---|---|---|
| 5,873,054 A | * | 2/1999 | Warburton et al. | 702/190 |
| 5,966,684 A | * | 10/1999 | Richardson et al. | 702/191 |
| 6,126,595 A | * | 10/2000 | Amano et al. | 600/300 |
| 6,310,646 B1 | * | 10/2001 | Shi et al. | 348/194 |
| 6,600,515 B2 | * | 7/2003 | Bowyer et al. | 348/461 |
| 6,760,321 B2 | * | 7/2004 | Shamsunder | 370/342 |
| 2003/0068097 A1 | * | 4/2003 | Wilson et al. | 382/276 |

OTHER PUBLICATIONS

"32-bit, 192 kHz Asynchronous Sample Rate Converter", CS8421 Preliminary Product Information, Cirrus Logic, pp. 1-36, Jan. 2005.
"Digital Audio Sample Rate Converter", CS8420 Product Information, Cirrus Logic, pp. 1-94, Aug. 2005.

* cited by examiner

*Primary Examiner*—Nitin C Patel
(74) *Attorney, Agent, or Firm*—Ropes & Gray LLP

(57) ABSTRACT

Precise timing information produced by a block average module may be provided to signal processing circuitry. A sample period value generator may produce samples of the input data period values. A progressive block averaging computation may be applied to the generated input data period value samples. The output of the progressive block averaging computation may be used as the precise input sample rate information. The precise input sample rate information may in turn drive a signal processing application. The precision of the clock information may be increased with an increase in startup overhead.

36 Claims, 5 Drawing Sheets

METHODS AND APPARATUS FOR GENERATING PRECISE TIMING INFORMATION USING PROGRESSIVE BLOCK AVERAGING

CROSS REFERENCE TO RELATED APPLICATION

This application claims the benefit of U.S. Provisional Application No. 60/812,307, filed Jun. 8, 2006 which is hereby incorporated by reference herein in its entirety.

BACKGROUND OF THE INVENTION

The present invention is directed to methods and apparatus for generating precise timing information for use in signal processing applications, and more particularly to performing progressive block averaging on arbitrary input sample period values.

High precision timing information is generally provided to a signal processing or re-sampling circuitry using a phase-locked loop (PLL). The PLL may receive a feedback signal from a First-In-First-Out (FIFO) memory. The feedback signal may indicate to the PLL whether the read rate of the data from the FIFO (e.g., output sample rate) is too high or too low relative to the incoming sample rate. The PLL may then adjust the clock period accordingly to provide precise timing information. As defined herein precise timing information is the information (e.g., clock signals) that indicates the ideal conditions (e.g., clock rate) for processing incoming data signals. The FIFO circuit may be used to buffer the incoming data signal stream to allow the output of the FIFO to be read at an appropriate time.

A precise ratio between the input/output sample rates may be needed for further signal processing (e.g., re-sampling). For example, an audio/video signal processing circuit may be configured to processes data using a particular clock signal. However, the processing circuit may receive the data from a system which may use a different clock signal. Accordingly, a PLL albeit this difference, may help to provide the relative timing information. The signal quality of the processed (e.g., re-sampled) output may be directly proportional to the precision and accuracy of the timing information.

Although PLL devices can be used to generate precise clock information, they lack a simple implementation because they require complex multiplier circuits. Each stereo channel (in audio applications) may require its own PLL and may further increase the complexity of these designs.

The PLL designs may lack the ability to produce precise clock information quickly. This is because PLL designs may have a high start-up time (e.g., time to lock) when designed for low bandwidth applications and thus substantial time may be lost for the initial precise clock information generation. Further, the time to lock is non-deterministic and may vary on the condition of the input signal or data stream. Moreover, because PLL designs or similar feedback mechanisms oftentimes have a high start-up overhead they are limited in their ability to provide precise timing information for high number of bits of resolution (e.g., 20 or more).

SUMMARY OF THE INVENTION

In accordance with the principles of the present invention, methods and apparatus are provided for using progressive block averaging to efficiently and accurately generate precise timing information for use in signal processing applications. A sample input period value generator may produce samples of the input data stream period. A progressive block averaging computation may be applied to the generated sample values of the input data period. The output of the progressive block averaging computation may be used as the precise input sample rate information in a signal processing application. The clock information may become more precise and accurate as startup overhead is increased and as the average is computed over a larger number of samples of the input data period.

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION

Figure 1:
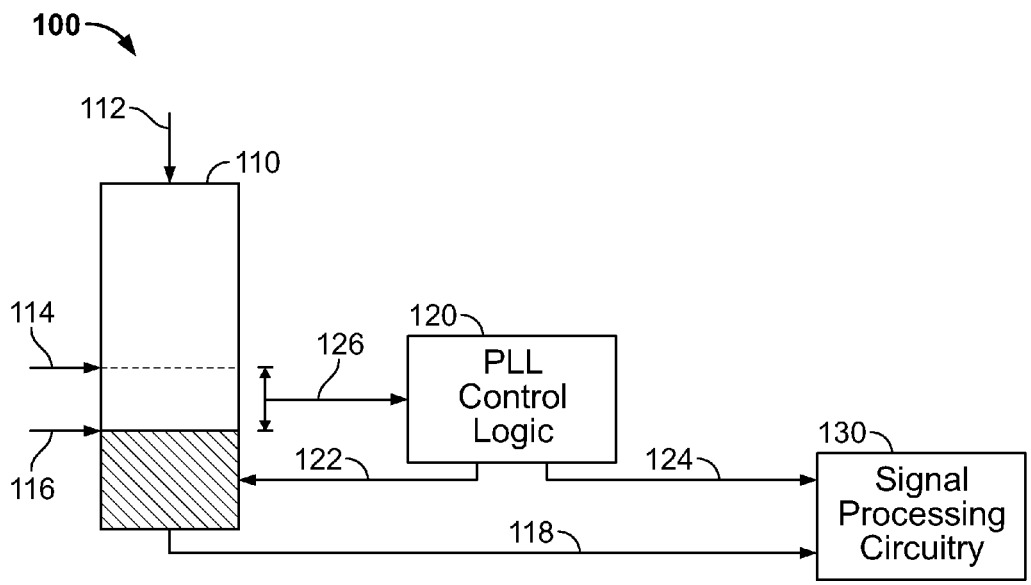
FIG. 1 is a diagram of an illustrative conventional PLL architecture for generating precise timing information for signal processing.

FIG. 1 is a diagram of a conventional PLL architecture 100 that may be used for generating precise timing information for signal processing. PLL architecture 100 may include a FIFO 110, a PLL control logic 120 and signal processing circuitry 130. As shown in FIG. 1, input data 112 may be received at one rate by FIFO 110. PLL control logic 120 may provide a control signal 122 (e.g., a read signal) to FIFO 110. Control signal 122 may cause output data 118 to be read from FIFO 110. Output data 118 is provided to signal processing circuitry 130 (e.g., for re-sampling). The rate at which output data 118 may be read may depend on control signal 122. For example, as the rate of control signal 122 is increased the rate at which output data 118 is provided may increase.

FIFO 110 may provide a threshold control signal 126 to PLL control logic 120. Threshold control signal 126 may indicate the difference between the actual level 116 of data in FIFO 110 and the reference threshold level 114. As actual level 116 falls below reference threshold level 114 (e.g., due to a high output data rate), threshold control signal 126 may cause PLL control logic 120 to reduce the output data rate. This may allow the input data to approach the reference threshold level because the output data is read at a slower rate.

PLL control logic 120 may generate precise clock information signal 124 based on threshold control signal 126. PLL control logic 120 may track the output rate and the input rate using threshold control signal 126. A counter or multiplier may be housed in PLL control logic 120 to generate the precise input/output sampling ratio information and in turn produce precise clock information signal 124.

As discussed above, such PLL designs lack a simple implementation because they require complex multiplier circuits. Also, such PLL designs are deficient in that they lack the ability to produce precise clock information quickly.

Figure 2:
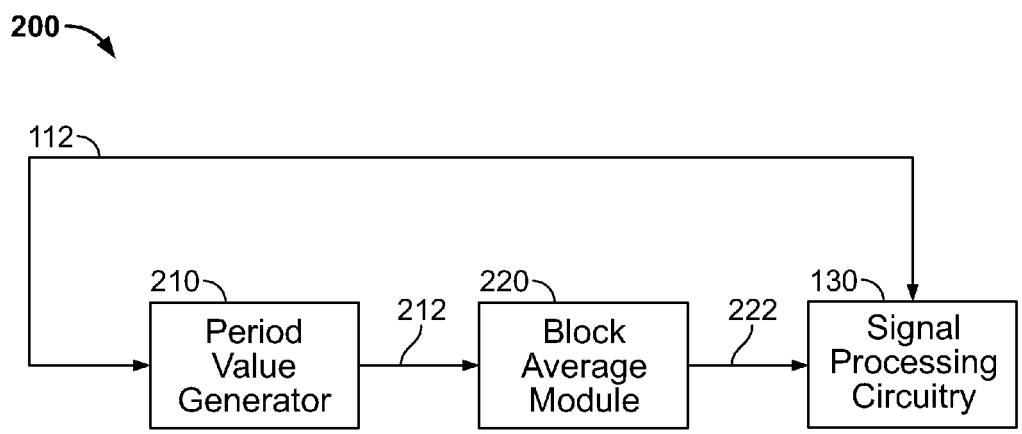
FIG. 2 is a diagram of an illustrative block averaging architecture for generating precise timing information in accordance with an embodiment of the present invention.

FIG. 2 is a diagram of an illustrative block averaging architecture 200 for quickly and efficiently generating precise timing information in accordance with an embodiment of the invention. Block averaging architecture 200 may include a period value generator 210, a block average module and signal processing circuitry 130. Period value generator 210 may measure the period of time between one or more input data values 112 (e.g., input data rate). Period value generator 210 may output the input data rate measurement as one or more sample input period values 212 to block average module 220.

The sample input period values may be measured in terms of the number of clock cycles of a clock (not shown) in architecture 200. The clock may also be used to operate any of the other modules in architecture 200. For example, signal processing circuitry (or application) 130 may receive the clock signal and derive a different clock (e.g., faster or slower clock) in order to perform computations.

Block average module 220 may be used to compute a progressive block average of sample input period values 212. Block average module 220 may perform a progressive multi-stage block averaging computation and generate precise timing information 222. For example, block average module 220 may receive a number of input period value samples and compute an average value over subsets of the samples in one or more stages. In particular, in a first stage, block average module 220 may compute a sub-average value of a first subset of samples and provide the results to a second stage. At a later time in the first stage, block average module 220 may compute a sub-average value of a second subset of the samples and provide the results to the second stage. In the second stage, block average module 220 may compute the average of one or more sub-average values it receives from the first stage.

Computing the average value of the sample input period in multiple block averaging stages may increase the precision of the precise clock information. The increase in precision may be provided by increasing the memory size and the number of adder modules. A more detailed description of block average module 220 will be provided in connection with FIGS. 3-5.

Architecture 200 may generate precise timing information at a faster rate and greater accuracy than known PLL feedback systems. Additionally, architecture 200 may generate precise timing information at a smaller cost than complex PLL feedback systems. For example, the need for a FIFO may be obviated. Also, block average module 220 may be implemented using a small amount of memory and several adders. The memory may store sample values of the input period and the adders may be used compute sub-average and average values of the input period value samples.

Signal processing circuitry 130 may implement a signal processing application. Precise timing information 222 may be provided to signal processing circuitry 130. Signal processing circuitry 130 may perform a signal processing computation on input data values 112 using precise timing information 222. Because precise timing information 222 may represent the input data rate with a high resolution (e.g., more than 20 bits) signal processing circuitry 130 may produce a more accurate result.

For example, signal processing circuitry 130 may resample data values 112 to their operating clock (not shown). In particular, the operating clock may be 44.2 kHz and the input data rate may be 44.1 kHz. Precise timing information 222 may indicate to signal processing circuitry 130 the precise timing information (which may be an average of input data period values 112). In turn, signal processing circuitry 130 may utilize timing information 222 to compute the correct resampled data at 44.1 kHz. This computation may produce a result that more accurately represents input data 112 and has a low signal to noise ratio (SNR).

Figure 3:
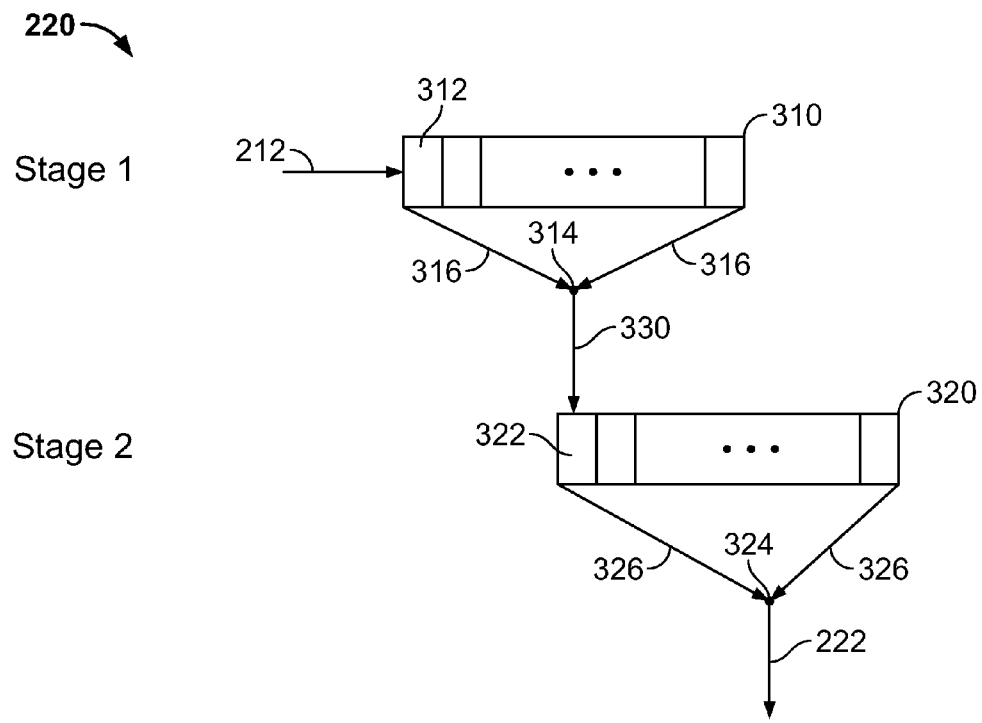
FIG. 3 is a detailed diagram of an illustrative block averaging computation in accordance with an embodiment of the present invention.

FIG. 3 is a detailed diagram of an illustrative block averaging computation. As shown in FIG. 3, block averaging module 220 may include a sub-average value accumulating block 310 and an average value accumulating block 320. For purposes of illustration, sub-average value block 310 and average value accumulating block 320 are shown and described as a memory. However, it should be understood that sub-average value block 310 and average value accumulating block 320 may be implemented using an accumulator, a small processor, or any other hardware or software component that may be capable of storing data and/or performing minor computations (e.g., additions and divisions).

Each sample input period value 212 may be received by block average module 220 and stored as a new entry 312 in sub-average value block 310. It should be understood that when a memory is used to implement sub-average value accumulating block 310 or average value block 320, each entry 312/322 may be representative of a single storage location in the memory. The data values may be read from entries 312/322 for subsequent addition/division operations or any other desired computation. It should also be understood that when an accumulator is used to implement sub-average value accumulating block 310 or average value block 320, each entry 312/322 may be representative of a bit in the accumulation value. Thus, the precision and accuracy of the sum or average value increases proportionally with the number of entries 312/322 available in the accumulator. When sample input period values 212 fill up all or most of entries 312 in sub-average value block 310, a sub-average value computation may be performed. To perform the sub-average value computation, a sum 316 of all of entries 312 may be computed. An adder may be used to compute this value.

Alternatively, if sub-average value block 310 is implemented as an accumulator, each entry 312 may represent a bit of the running sum of sample input period values 212 that may be received. Sum 316 of all entries 312 may then be the output of the accumulator.

Figure 4:
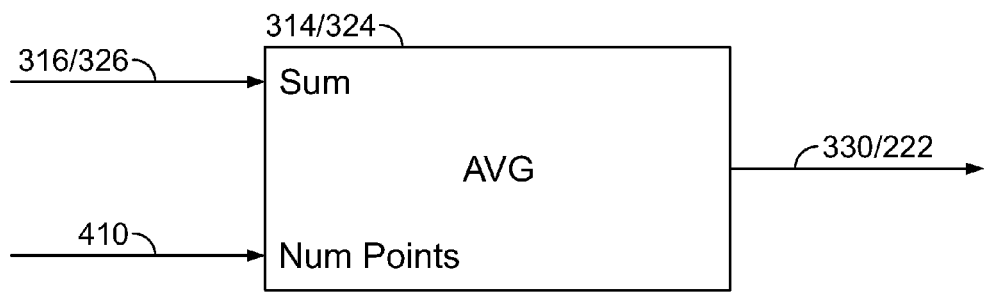
FIG. 4 is a diagram of an illustrative average block in accordance with an embodiment of the present invention.

Sum 316 of all entries 312 may be processed by average block 314 (FIG. 4). Average block 314 may in turn provide the sub-average value 330 of the subset of sample input period values 212 which may be stored in sub-average value block 310. The precision of sub-average value 330 may increase as the number of entries 312 increases. For example, a sub-average value of four sample input period values 212 may be a less accurate (i.e., smaller precision) representation of the period value of input data 112 than a sub-average value of eight sample input period values 212.

Sum 316 or sub-average value 330 may be computed for any number of entries 312 in sub-average value block 310. For example, sub-average value 330 may be computed when half (or any number greater than or less than half) of entries 312 are occupied. This may provide a user with greater control over the accuracy of the computations of sub-average values 330. This may allow the user to reduce startup overhead at the expense of precision. In particular, the startup overhead may depend on the number of samples over which an average or sub-average value is computed.

Sub-average value 330 may be provided to average value block 320 and stored as a new entry 322.

This may enable the memory or accumulator of sub-average value block 310 to be cleared and reused. A new subset of sample input period values 212 may be received and stored as entries 312. A subsequent sub-average value 330 computation may be performed on the new subset of sample input period values 212.

Average value block 320 may perform similar functions as sub-average value block 310. In particular, average value block 320 may receive and store a number of sub-average values 330. A sum 326 of all sub-average values 330 stored in entries 322 may be computed and provided to an average block 324.

Alternatively, if sub-average value block 320 is implemented as an accumulator, each entry 322 may be a running sum of sub-average values 330 that may be received by average value block 320. Average value 326 of all entries 322 may then be the output of the accumulator.

As described above, average block 324 may compute the average of the sub-average values 330. The output of average block 324 may be provided as precise timing information 222 to another system component. Precise timing information 222 may be an accurate representation of the period of input data 112 (e.g., the input data rate).

In particular, the accuracy of precise timing information 222 may be proportional to the number of entries 322 in averaging block 320.

It should be understood that the number of entries 322 in averaging block 320 may be different from the number of entries 312 in sub-averaging block 310. In particular, the subset size of sample input period values 212 may correspond to the number of entries 312 in sub-average value block 310; whereas, the accuracy of precise timing information 222 may correspond to the number of entries 322 in average block 320.

It should also be understood that precise timing information 222 may be computed for any number of entries 322 in average value block 320. In particular, not all of entries 322 need to be occupied to provide an accurate representation of the input data rate. Consequently, the startup time or latency may depend on the number of entries 322 that may be desired for the computation of precise timing information 222. In particular, when a high accuracy of precise timing information 222 is desired, more entries 322 may be occupied prior to computing their average value. Alternatively, moderate accuracy of precise timing information 222 may be provided by computing the average value of less entries 322. This allows the user to trade off accuracy of precise timing information 222 with startup overhead.

For example, sub-average value block 310 may include 64 entries 312. In particular, 64 sample input period values may be accumulated and stored in sub-average value block 310. Sub-average value 330 of the 64 entries 312 may be computed and stored as entry 322 in average value block 320. When the input data rate is 44.1 kHz, computing sub-average value 330 for 64 samples may take 1.45 ms (e.g., the startup time (overhead) may be 1.45 ms). Accordingly, if the average value of one entry 322 of average value block 320 is computed, the accuracy of precise timing information 222 may be 17 bits and may take 1.45 ms.

For a higher accuracy (e.g., 18 bits) of precise timing information 222, the average value of two or more entries 322 should be computed. However, this may increase the startup time. In particular, after sub-average value 330 of a first subset (e.g., 64 entries 312) of sample input period values is stored as entry 322, sub-average value 330 of a second subset should be computed. It may take another 1.45 ms to compute sub-average value 330 of a second subset, if the second subset also includes 64 entries 312. Sub-average value 330 corresponding to the second subset of sample input period values may be stored as a second entry 322 in average value block 320.

The average value of the sub-average values stored as entries 322 may be computed to provide precise timing information 222. Accordingly, the average value computation of two subsets of sample input period values may provide precise timing information 222 having a precision of 18 bits at the expense of greater overhead of 2.90 ms (e.g., the sum total of the sub-average value computation times 1.45 ms for each of the two sample input period value subsets).

FIG. 4 is a diagram of an illustrative average block 314/324. Average block 314/324 may receive a sum 316/326 and the subset size 410. Average block 314/324 may perform a mathematical right bit shift or divide computation and output sub-average value 330 or average value (precise timing information) 222.

The subset size 410 may correspond to the number of entries 312/322 in sub-average and average block 310/320. For example, to compute the average value of 64 sample period values, subset size 410 may be configured to be 64. This allows averaging block 314/324 to perform an average over 64 values. Similarly, to compute the average value of 4 sub-average values, subset size 410 may be configured to be 4.

In some scenarios it may be desirable to change the value of subset size 410 during the computation of precise timing information 222. For example, there may be 8 available entries 322 in average computation block 320. Accordingly, subset size 410 may be configured to be 8. However, it may be desirable to output precise timing information 222 when less than 8 (e.g., four) sub-average values are stored to average value block 320 as entries 322. Thus, subset size 410 may be reduced to 4 in order to correspond to the number of sub-average values that may be stored to average value block 320.

In some embodiments, a counter (not shown) may be used to determine the number of entries 312/322 stored to average value block 320 and sub-average value block 310. The counter may be incremented with each new entry stored to sub-average and average value blocks 310/320. The output of the counter may be input to average block 314/324 as subset size 410.

The counter may also be used to reset sub-average and average value blocks 310/320 upon reaching a particular value. The particular value may be the desired subset size of sample input period values 212. Resetting sub-average and average value blocks 310/320 may cause the values stored to change to zero and allow a new subset of sample input period values to be stored. For example, if an accumulator is used to store the values in a subset, the sum of the accumulator may be zero after reset (e.g., after the desired number of values have been accumulated).

Figure 5:
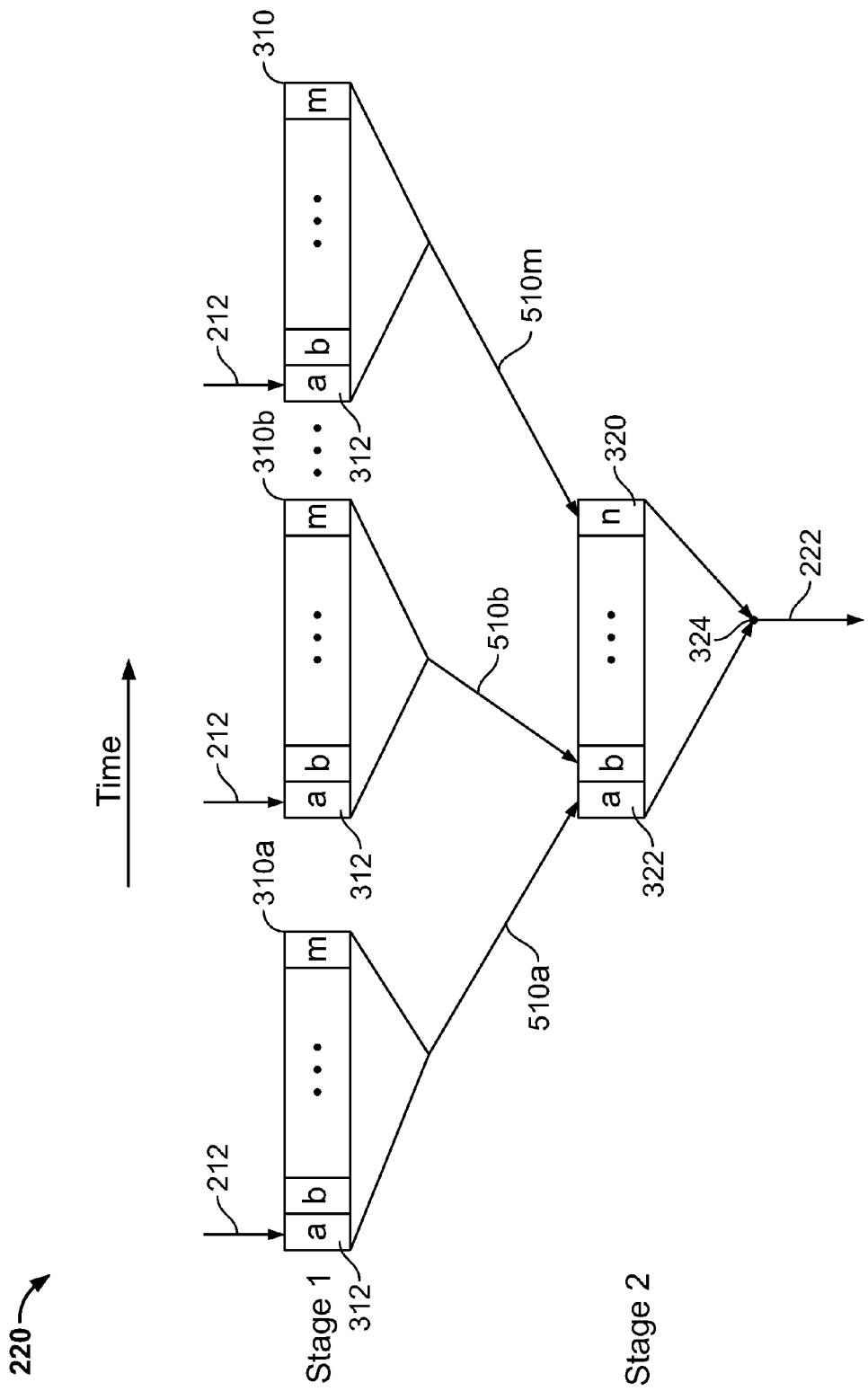
FIG. 5 is a detailed diagram of an illustrative block averaging computation in accordance with an embodiment of the present invention.

FIG. 5 is a detailed diagram of block average module 220. In particular, FIG. 5 is an illustration of block average computations described in FIG. 3 over the passage of a time interval. As shown in FIG. 5, a first subset of input sample period values 212(*a-m*) may be stored as entries 212 to sub-average value block 310*a* during a first time period. A sub-average value computation 510*a* may be performed on the first subset of period values 212*a-m*. The result of the sub-average computation may be stored as an entry 322(*a*) in average value block 320. Sub-average value block 310*a* may be reset after the result of the sub-average value computation is stored in average value block 320. Sub-average value block 310*a* may be reused as sub-average value block 310*b* after the reset operation. This may allow the sub-average value of a subsequent subset of input sample period values to be computed.

A second subset of input sample period values 212a-m may be stored as entries 312a-m to sub-average value block 310b during a second time period. A sub-average value computation 510b may be performed on the second subset of period values a-m. The result of the sub-average computation may be stored as an entry 322(b) in average value block 320. Sub-average value block 310b may be reset after the storage of the sub-average computation result.

After a number of desired sub-average values 510a-n are stored to average value block 320, precise timing information 222 may be computed. The average value of sub-average value entries 322a-n may be computed. The result of this computation may be provided as precise timing information 222.

It should be understood that precise timing information 222 may be computed when any number of sub-average values 510a-n are stored as entries 322a-n. For example, precise timing information 222 may be computed after two sub-average values 510a and 510b are stored as entries 322a and 322b. The accuracy of precise timing information 222 may increase as subsequent sub-average values 510c-n (stored as entries 322c-n) are included in the average value computation of entries 322a-n.

In some embodiments, it may be desirable to provide the sum of the subset of sample input period values 312a-m to average value block 320 for storage as entries 322a-n instead of their sub-average values. Precise timing information 222 may be computed by first computing the average value of the sums stored as entries 322a-n and secondly by dividing the average of the sum by the number of sample input period values that are represented by the sums. This may provide the advantage of reducing the number of intermediate average blocks 314.

For example, the value of a first subset sum representing 8 sample input period values may be 5100 and may be stored as entry 322a. The value of a second subset sum representing 8 sample input period values may be 6000 and may be stored as entry 322b. To compute precise timing information 222, the average values of entries 322a and 322b may be computed first. The result of this computation may be 5550. Dividing the average value result by the number of sample period values that each sum represents (e.g., 8) may provide precise timing information of 693.75 (e.g., the average value over 16 sample input period values).

In some embodiments, average value block 320 may be implemented as a single stage Cascade Integrator Comb (CIC) filter. CIC filters are known efficient implementations of moving averages. For the sake of brevity, a discussion of their implementation is omitted from this description.

Figure 6:
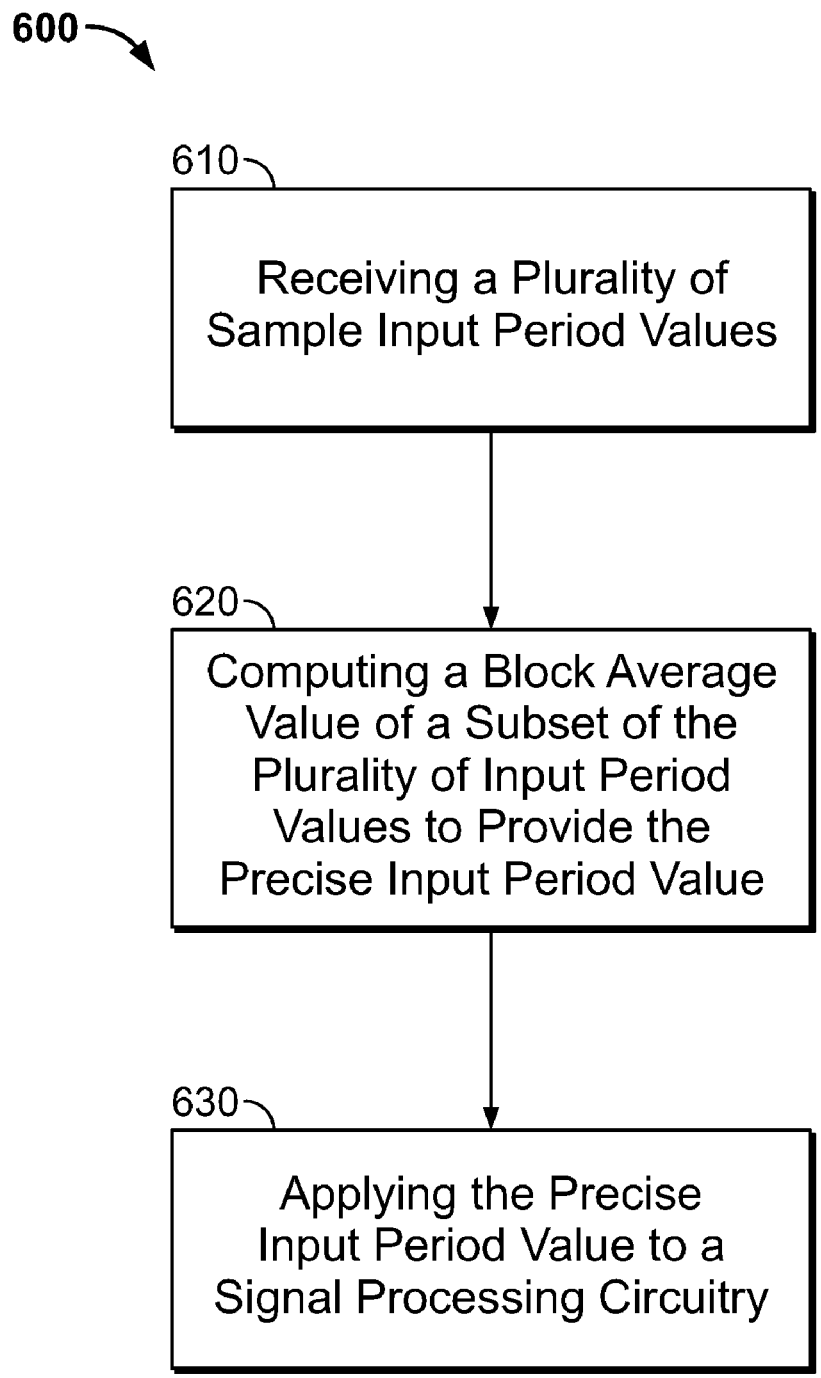
FIG. 6 illustrates a method for generating a precise input period value in accordance with an embodiment of the present invention.

FIG. 6 illustrates a method 600 for generating a precise input period value. At step 610, multiple sample input period values may be received. For example, as shown in FIG. 5 sub-average value block 310 may receive sample input value period values 212. These values may be stored as entries 312.

At step 620, a block average value of a subset of the plurality of input period values may be computed to provide the precise input period value. For example, as shown in FIG. 5, the subset of sample input period values stored in sub-average block 310 may be averaged and the average result 510 may be provided as precise timing information 222. As subsequent subsets are received, sub-average values 510a-b may be averaged by average value block 320. The average of the values stored as entries 322 in average value block 320 may be provided as a more accurate precise timing information 222.

At step 630, the precise input period value may be applied to signal processing circuitry. For example, as shown in FIG. 2, the precise timing information 222 output from block average module 220 may be applied to signal processing circuitry 130.

Figure 7:
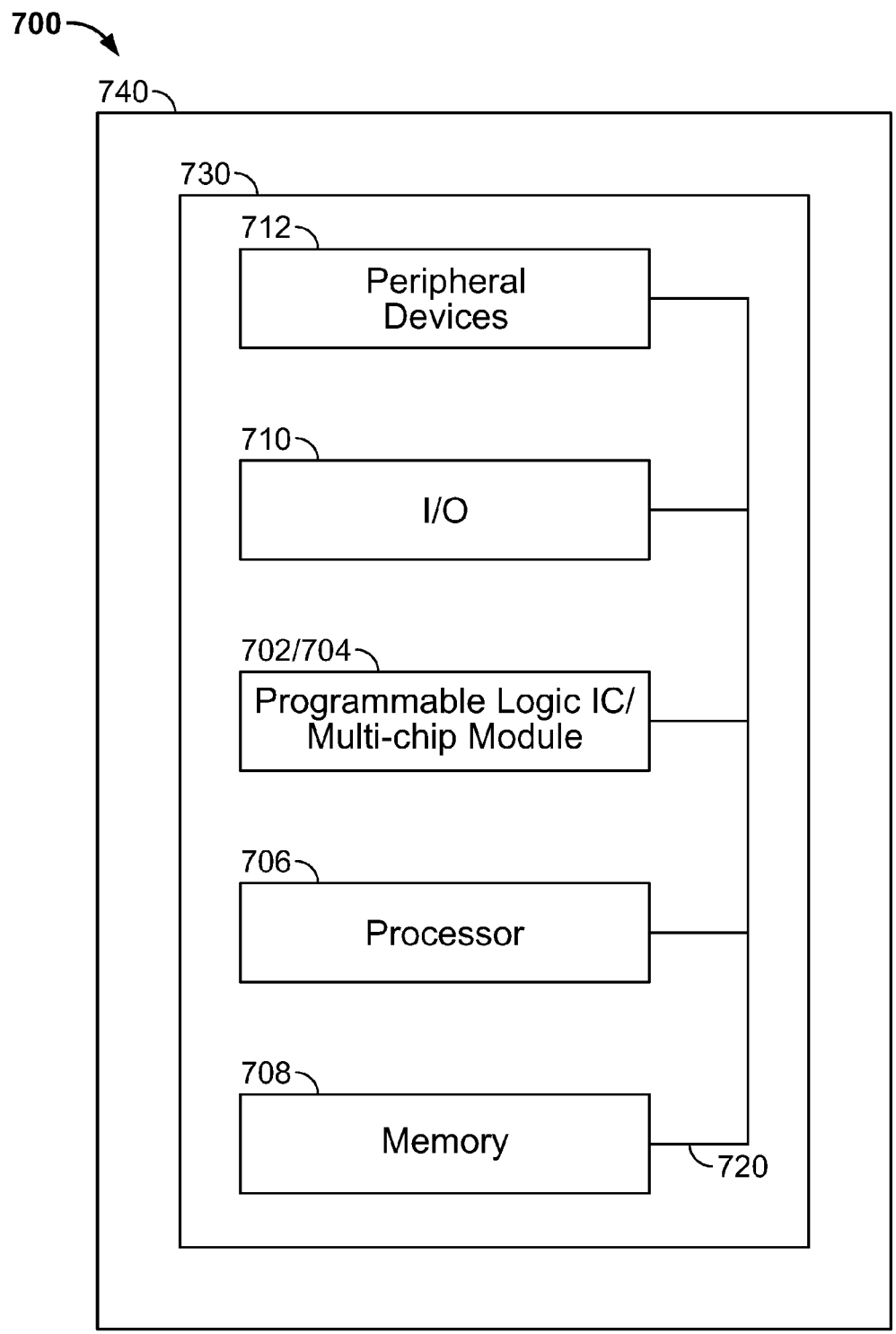
FIG. 7 is a simplified schematic block diagram of an illustrative system employing a programmable logic resource in accordance with the invention.

FIG. 7 illustrates a programmable logic resource 702 or multi-chip module 704 which includes embodiments of this invention in a data processing system 700. Data processing system 700 can include one or more of the following components: a processor 706, memory 708, I/O circuitry 710, and peripheral devices 712. These components are coupled together by a system bus or other interconnections 720 and are populated on a circuit board 730 which is contained in an end-user system 740.

System 700 can be used in a wide variety of applications, such as computer networking, data networking, instrumentation, video/audio processing, digital signal processing, or any other application where the advantage of using programmable or reprogrammable logic is desirable. Programmable logic resource/module 702/704 can be used to perform a variety of different logic functions. For example, programmable logic resource/module 702/704 can be configured as a processor or controller that works in cooperation with processor 706. Programmable logic resource/module 702/704 may also be used as an arbiter for arbitrating access to a shared resource in system 700. In yet another example, programmable logic resource/module 702/704 can be configured as an interface between processor 706 and one of the other components in system 700. It should be noted that system 700 is only exemplary, and that the true scope and spirit of the invention should be indicated by the following claims. All or part of programmable logic resource/module 702/704 can also be configured to perform a block averaging computation which may be used to generate precise timing information.

Various technologies can be used to implement programmable logic resources 702 or multi-chip modules 704 having the features of this invention, as well as the various components of those devices (e.g., programmable logic connectors ("PLCs") and programmable function control elements ("FCEs") that control the PLCs). For example, each PLC can be a relatively simple programmable connector such as a switch or a plurality of switches for connecting any one of several inputs to an output. Alternatively, each PLC can be a somewhat more complex element that is capable of performing logic (e.g., by logically combining several of its inputs) as well as making a connection. In the latter case, for example, each PLC can be a product term logic, implementing functions such as AND, NAND, OR, or NOR. Examples of components suitable for implementing PLCs include EPROMs, EEPROMs, pass transistors, transmission gates, antifuses, laser fuses, metal optional links, etc. PLCs and other circuit components may be controlled by various, programmable, function control elements ("FCEs"). For example, FCEs can be SRAMS, DRAMS, magnetic RAMS, ferro-electric RAMS, first-in first-out ("FIFO") memories, EPROMS, EEPROMs, function control registers, ferro-electric memories, fuses, antifuses, or the like. From the various examples mentioned above it will be seen that this invention is applicable to both one-time-only programmable and reprogrammable resources.

It should be understood that the foregoing is only illustrative of the principles of the invention, and that the invention can be practiced by other than the described embodiments and aspects of the invention, which are presented for purposes of illustration and not of limitation, and the present invention is limited only by the claims which follow.

What is claimed is:

1. A method for providing a precise input period value, the method comprising:
   storing, in a memory, a plurality of sample input period values generated based on an input data signal;
   computing, using processing circuitry, a block average value of a first subset of the plurality of sample period values to provide a digital representation of the precise input period value;
   applying the digital representation of the precise input period value to a signal processing circuitry; and
   re-sampling the input data signal based on the digital representation of the precise period value.

2. The method of claim 1, wherein the computing the block average further comprises:
   accumulating a first portion of the first subset of the plurality of sample period values;
   accumulating a second portion of the first subset of the plurality of sample period values; and
   computing an average value of the accumulated first and second portions of the first subset of the plurality of sample period values.

3. The method of claim 2 further comprising accumulating the first and the second accumulated portions of the first subset of the plurality of sample period values.

4. The method of claim 3, wherein the average value is computed by performing a right bit shift on the bits in the accumulated first and second portions of the first subset.

5. The method of claim 1, wherein each of the plurality of sample input period values is generated by measuring a number of clock cycles between two input data values.

6. The method of claim 1, wherein the block average is computed in at least two stages, further comprising:
   in a first of the at least two stages:
      accumulating a first portion of the first subset during a first time period; and
      accumulating a second portion of the first subset during a second time period; and
   in a second of the at least two stages:
      accumulating a precision value with the accumulated first portion during the second time period; and
      further accumulating the precision value with the accumulated second portion during a third time period.

7. The method of claim 6, wherein the second of the at least two stages further comprises computing the digital representation of the precise input period value by computing an average value of the accumulated precision value.

8. The method of claim 1, wherein the block average is computed progressively such that the accuracy of the digital representation of the precise input period value increases as the size of the first subset increases.

9. The method of claim 8, wherein the progressive block average is computed in at least two stages, further comprising:
   in a first of the at least two stages:
      computing a first sub-average value of the first subset during a first time period; and
   in a second of the at least two stages:
      generating the precise input period value by computing an average value of the first sub-average values during a second time period.

10. The method of claim 9 further comprising:
    in a first of the at least two stages:
       computing a second sub-average value of a second subset during a second time period; and
    in a second of the at least two stages:
       generating the precise input period value by computing an average value of the first and second sub-average values during a third time period.

11. The method of claim 1, wherein the re-sampling comprises changing a clock rate at which the input data signal is processed based on the digital representation of the precise period value.

12. An apparatus for providing a precise input period value, the apparatus comprising:
    means for storing a plurality of sample input period values generated based on an input data signal;
    means for computing a block average value of a first subset of the plurality of sample period values to provide a digital representation of the precise input period value;
    means for applying the digital representation of the precise input period value to a signal processing circuitry means; and
    means for re-sampling the input data signal based on the digital representation of the precise period value.

13. The apparatus of claim 12, wherein the means for computing the block average further comprises:
    means for accumulating a first portion of the first subset of the plurality of sample period values;
    means for accumulating a second portion of the first subset of the plurality of sample period values; and
    means for computing an average value of the accumulated first and second portions of the first subset of the plurality of sample period values.

14. The apparatus of claim 13 further comprising means for accumulating the first and the second accumulated portions of the first subset of the plurality of sample period values.

15. The apparatus of claim 14, wherein the average value is computed by performing a right bit shift on the bits in the accumulated first and second portions of the first subset.

16. The apparatus of claim 12, wherein each of the plurality of sample input period values is generated by measuring a number of clock cycles between two input data values.

17. The apparatus of claim 12, wherein the block average is computed in at least two stages, further comprising:
    in a first of the at least two stages:
       means for accumulating a first portion of the first subset during a first time period; and
       means for accumulating a second portion of the first subset during a second time period; and
    in a second of the at least two stages:
       means for accumulating a precision value with the accumulated first portion during the second time period; and
       means for further accumulating the precision value with the accumulated second portion during a third time period.

18. The apparatus of claim 17, wherein the second of the at least two stages further comprises computing the digital representation of the precise input period value by computing an average value of the accumulated precision value.

19. The apparatus of claim 12, wherein the block average is computed progressively such that the accuracy of the digital representation of the precise input period value increases as the size of the first subset increases.

20. The apparatus of claim 19, wherein the progressive block average is computed in at least two stages, further comprising:
    in a first of the at least two stages:
       means for computing a first sub-average value of the first subset during a first time period; and in a second of the at least two stages:
    means for generating the precise input period value by computing an average value of the first sub-average values during a second time period.

21. The apparatus of claim 20 further comprising:
in a first of the at least two stages:
    means for computing a second sub-average value of a second subset during a second time period; and
in a second of the at least two stages:
    means for generating the precise input period value by computing an average value of the first and second sub-average values during a third time period.

22. A system for providing a precise input period value, the system comprising:
    a memory for storing a plurality of sample input period values generated based on an input data stream;
    a block average module that receives the plurality of sample input period values, computes a block average value of a first subset of the plurality of sample period values, and outputs a digital representation of the precise input period value; and
    signal processing circuitry that:
        processes the input data stream using the digital representation of the precise input period value; and
        re-samples the input data signal based on the digital representation of the precise period value.

23. The system of claim 22, wherein the block average module is configured to:
    accumulate a first portion of the first subset of the plurality of sample period values;
    accumulate a second portion of the first subset of the plurality of sample period values; and
    compute an average value of the accumulated first and second portions of the first subset of the plurality of sample period values.

24. The system of claim 23, wherein the block average module is configured to accumulate the first and the second accumulated portions of the first subset of the plurality of sample period values.

25. The system of claim 24, wherein the average value is computed by performing a right bit shift on the bits in the accumulated first and second portions of the first subset.

26. The system of claim 22, further comprising a period value generator that generates each of the plurality of sample input period values by measuring a number of clock cycles between two input data values of the input data stream.

27. The system of claim 22, wherein the block average value is computed in at least two stages, wherein the block average module is configured to:
in a first of the at least two stages:
    accumulate a first portion of the first subset during a first time period; and
    accumulate a second portion of the first subset during a second time period; and
in a second of the at least two stages:
    accumulate a precision value with the accumulated first portion during the second time period; and
    further accumulate the precision value with the accumulated second portion during a third time period.

28. The system of claim 27, wherein the block average module is further configured to compute the digital representation of the precise input period value by computing an average value of the accumulated precision value in the second of the at least two stages.

29. The system of claim 22, wherein the block average is computed progressively such that the accuracy of the digital representation of the precise input period value increases as the size of the first subset increases.

30. The system of claim 29, wherein the progressive block average is computed in at least two stages, wherein the block average module is configured to:
in a first of the at least two stages:
    compute a first sub-average value of the first subset during a first time period; and
in a second of the at least two stages:
    generate the precise input period value by computing an average value of the first sub-average values during a second time period.

31. The system of claim 30 wherein the block average module is further configured to:
in a first of the at least two stages:
    compute a second sub-average value of a second subset during a second time period; and
in a second of the at least two stages:
    generate the precise input period value by computing an average value of the first and second sub-average values during a third time period.

32. A method for providing a precise input period value, the method comprising:
    storing, in a memory, a first plurality of sample input period values, wherein each of the first plurality of sample input period values represents a measure of a data rate of an input data signal;
    computing a block average value of sample input period values corresponding to the input data signal to provide the precise input period value, wherein the computing comprises:
        retrieving from the memory the first plurality of sample input period values;
        computing a first sum of the retrieved first plurality of sample input period values;
        computing a second sum of a second plurality of sample input period values;
        storing, in the memory, the first and second sums; and
        computing, as the block average value, and
    average of the stored first and second sums; and
    applying the precise input period value to a signal processing circuitry.

33. The method of claim 32, wherein:
    the first plurality of sample input period values are generated based on portions of the data signal received during a first time interval;
    the second plurality of sample input period values are generated based on portions of the data signal received in a second time interval subsequent to the first time interval; and
    the second plurality of sample input period values are retrieved from a same storage location of the memory as the first plurality of sample input period values.

34. The method of claim 32 further comprising:
    re-sampling the input data signal based on the precise input period value.

35. The method of claim 32, wherein the block average is computed in two stages, wherein:
    the first and second sums are computed and stored in a first of the two stages; and
    the average of the stored first and second sums is computed in a second of the two stages.

36. The method of claim 32 further comprising:
receiving a first portion of the input data signal, wherein the data signal includes a plurality of data bits;
measuring the data rate of the first portion of the input data signal to generate a first sample of the data rate;
receiving a second portion of the input data signal;
measuring the data rate of the second portion to generate a second sample of the data rate;
storing as the first plurality of sample input period values the generated first and second samples of the data rate.

* * * * *